United States Patent [19]

Naiki

[11] Patent Number: 5,726,791
[45] Date of Patent: Mar. 10, 1998

[54] LASER BEAM SCANNING APPARATUS

[75] Inventor: Toshio Naiki, Toyokawa, Japan

[73] Assignee: Minolta Co., Ltd., Osaka, Japan

[21] Appl. No.: 524,566

[22] Filed: Sep. 7, 1995

[30] Foreign Application Priority Data

Sep. 21, 1994 [JP] Japan ................... 6-226135

[51] Int. Cl.⁶ ................................. G02B 26/08
[52] U.S. Cl. ............. 359/205; 359/207; 359/212; 359/216; 359/900
[58] Field of Search .................. 359/205–207, 359/212–219, 738–740, 900; 347/259–261; 358/474, 296, 302

[56] References Cited

U.S. PATENT DOCUMENTS

| | | |
|---|---|---|
| 4,934,772 | 6/1990 | Sakuma et al. . |
| 5,033,806 | 7/1991 | Tomita et al. .......................... 359/216 |
| 5,052,767 | 10/1991 | Sugata et al. .......................... 359/216 |
| 5,111,219 | 5/1992 | Makino . |
| 5,128,795 | 7/1992 | Endou et al. . |
| 5,204,769 | 4/1993 | Matsumoto et al. ................... 359/216 |
| 5,245,462 | 9/1993 | Kanai et al. . |

Primary Examiner—James Phan
Attorney, Agent, or Firm—Burns, Doane, Swecker & Mathis, LLP

[57] ABSTRACT

A laser beam scanning apparatus used for scanning a surface of a photoreceptor in an image forming apparatus. In the laser beam scanning apparatus, the laser beam emitted from a semiconductor laser is formed into a bundle of parallel rays by an objective lens, thereafter is converged by a converging lens immediately in front of a deflector such as a polygonal mirror. The converged laser beam is deflected by the polygonal mirror, and is concentrated on a beam receiving surface by scanning lenses.

17 Claims, 2 Drawing Sheets

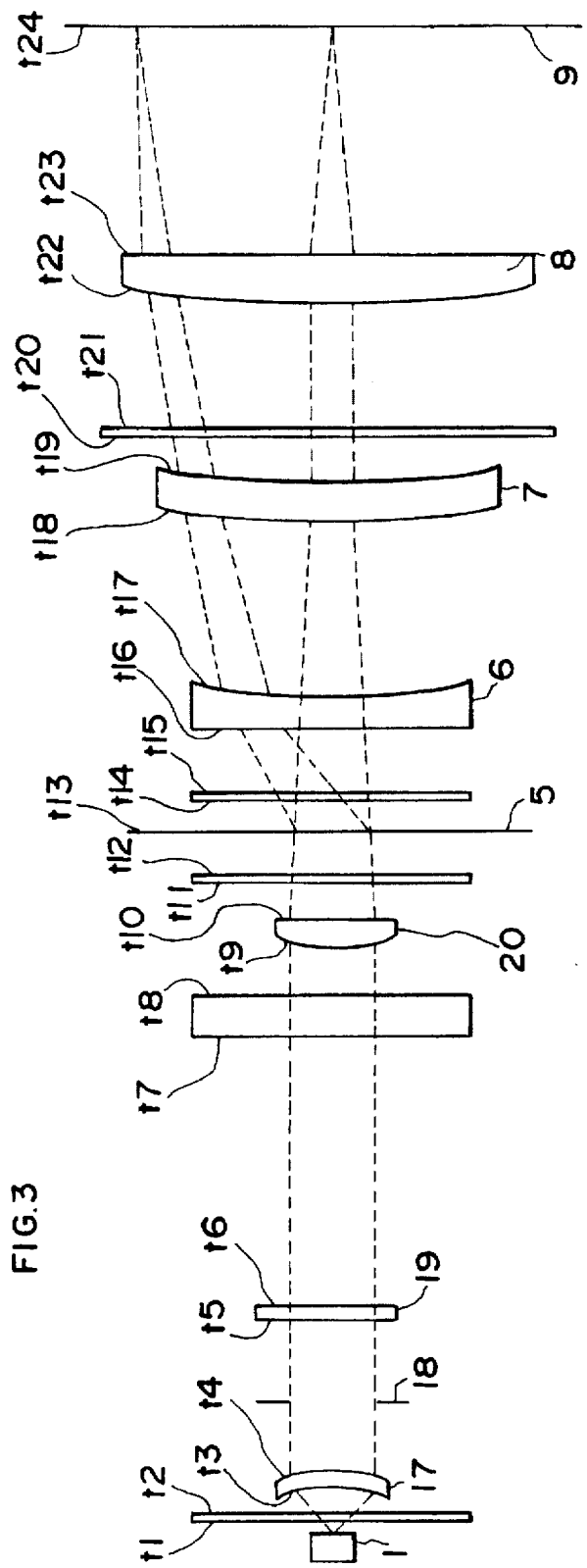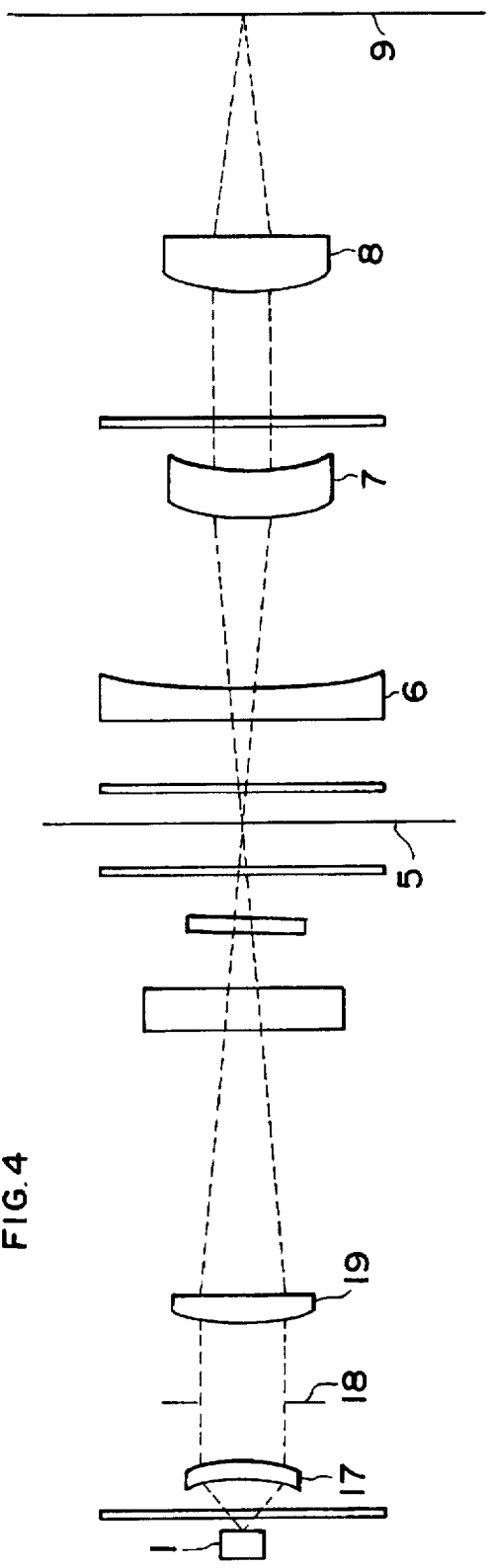
FIG.3
FIG.4

LASER BEAM SCANNING APPARATUS

BACKGROUND OF THE INVENTION

1. Field of the Invention

The present invention relates to a laser beam scanning apparatus, and more specifically, to a laser beam scanning apparatus employed in an image forming apparatus such as a laser beam printer or a digital copying machine respectively capable of forming an image on a photoreceptor surface by scanning the photoreceptor surface with a laser beam.

2. Description of the Related Art

Generally, in a laser beam scanning apparatus, a laser beam emitted from a semiconductor laser is converged by an objective lens, and is thereafter deflected by a rotatable deflector. Upon deflection by a reflecting surface of the deflector, the laser beam is concentrated onto a scanned surface by scanning lenses. The spot of the laser beam on the scanned surface moves with the rotation of the deflector, thereby forming a scanning line.

In the above laser beam scanning apparatus wherein the laser beam incident to the scanning lenses is converged, aberration deterioration is precluded which occurs due to great deflection of the laser beam. Accordingly, compared with the laser beam scanning apparatus wherein the laser beam incident to the scanning lenses is collimated, the maximum deflection angle of the laser beam can be made larger, resulting in a compact laser beam scanning apparatus.

The structure of a laser beam scanning apparatus wherein the laser beam incident to the scanning lenses is converged is illustrated in FIGS. 1 and 2. FIG. 1 is a cross-sectional view of the laser beam scanning apparatus in the direction in which the scanning line extends (referred to "main scanning direction" hereinafter). FIG. 2 is a cross-sectional view of the laser beam scanning apparatus in the direction orthogonal to the scanning line (referred to "sub-scanning direction" hereinafter).

As shown in FIG. 1, with respect to the main scanning direction, a laser beam 10 emitted from a semiconductor laser 1 is converged by an objective lens group 2 composed of three lenses, thereafter is regulated in width by an aperture 3 so as to have a predetermined beam diameter. Subsequently, the converged laser beam is deflected by a deflector 5 such as a polygonal mirror, and is concentrated on a scanned surface 9 (a photosensitive surface) by first, second and third scanning lenses 6, 7, 8 so as to scan the scanned surface 9.

While, as shown in FIG. 2, with respect to the sub-scanning direction, the laser beam 10 emitted from the semiconductor 1 is formed into a bundle of parallel rays by the objective lens group 2, and thereafter is regulated in width by the aperture 3 so as to have a predetermined beam diameter. Then, the bundle of parallel rays is converged by a cylindrical lens 4 which has power only in the sub-scanning direction, and is initially concentrated linearly on a reflecting surface of the deflector 5, and thereafter is concentrated again on the scanned surface 9 by the first, second and third scanning lenses 6, 7, 8.

Generally, due to an error in manufacturing or mounting of the deflector 5, or vibration in rotation of the deflector 5, the reflecting surface of the deflector 5 may have an inclination. The inclination of the reflecting surface of the deflector 5 causes a deviation of the spot of the laser beam in the sub-scanning direction, consequently giving rise to exposure irregularities. In an image forming apparatus such as a laser beam printer, the exposure irregularities deteriorate an image quality. The cylindrical lens 4 corrects the inclination of the reflecting surface of the deflector, with the result that the exposure irregularities of the scanning line are precluded. Specifically, the laser beam is initially concentrated on the reflecting surface of the deflector 5 by the cylindrical lens 4, but it is concentrated conjunctively on the scanned surface 9 by the scanning lenses 6, 7, 8. Consequently, the laser beam does not suffer the influence of the inclination of the reflecting surface of the deflector.

Then, when the focal distance of the cylindrical lens 4 is made longer in order to effectively correct the inclination of the reflecting surface of the deflector 5, the distance from the objective lens group 2 to the deflector 5 becomes longer, resulting in that higher convergence degree of the laser beam is required. However, when the convergence degree of the laser beam is increased, there arises the problem that the objective lens requires a very large effective diameter. In order to obtain the objective lens having a large effective diameter, the outer diameter of the objective lens must be made larger, and the number of the objective lenses must be increased for correcting the aberration, with the result that the size of the laser beam scanning apparatus becomes large. Accordingly, when the focal distance of the cylindrical lens 4 is made longer to effectively correct the inclination of the reflecting surface of the deflector 5 while keeping the apparatus size compact, the converged laser beam is close to parallel light due to its comparatively low convergence degree.

Further, when the laser beam is converged by the objective lens group 2, there arises another problem that the optical performance generally declines upon a change of the magnification of the objective lens.

SUMMARY AND OBJECTS

An object of the present invention is to provide a compact laser beam scanning apparatus.

Another object of the present invention is to provide a laser beam scanning apparatus wherein the distance from the objective lens to the deflector can be made longer and the convergence degree of the laser beam incident to the scanning lenses can be made higher without making the effective diameter of the objective lens larger.

These and other objects are achieved by providing a laser beam scanning apparatus comprising:

a light source for emitting a laser beam;

a first optical system for forming the laser beam into a bundle of substantially parallel rays with respect to a main scanning direction;

a second optical system for converging the bundle of substantially parallel rays with respect to the main scanning direction;

a deflector for deflecting the laser beam converged by said second optical system; and a third optical system for imaging the deflected laser beam on a scanned surface.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 3 is a cross-sectional view of a laser beam scanning apparatus according to the present invention with respect to the main scanning direction.

FIG. 4 is a cross-sectional view of the laser beam scanning apparatus according to the present invention with respect to the sub-scanning direction.

DETAILED DESCRIPTION OF THE PREFERRED EMBODIMENT

Figure 1:
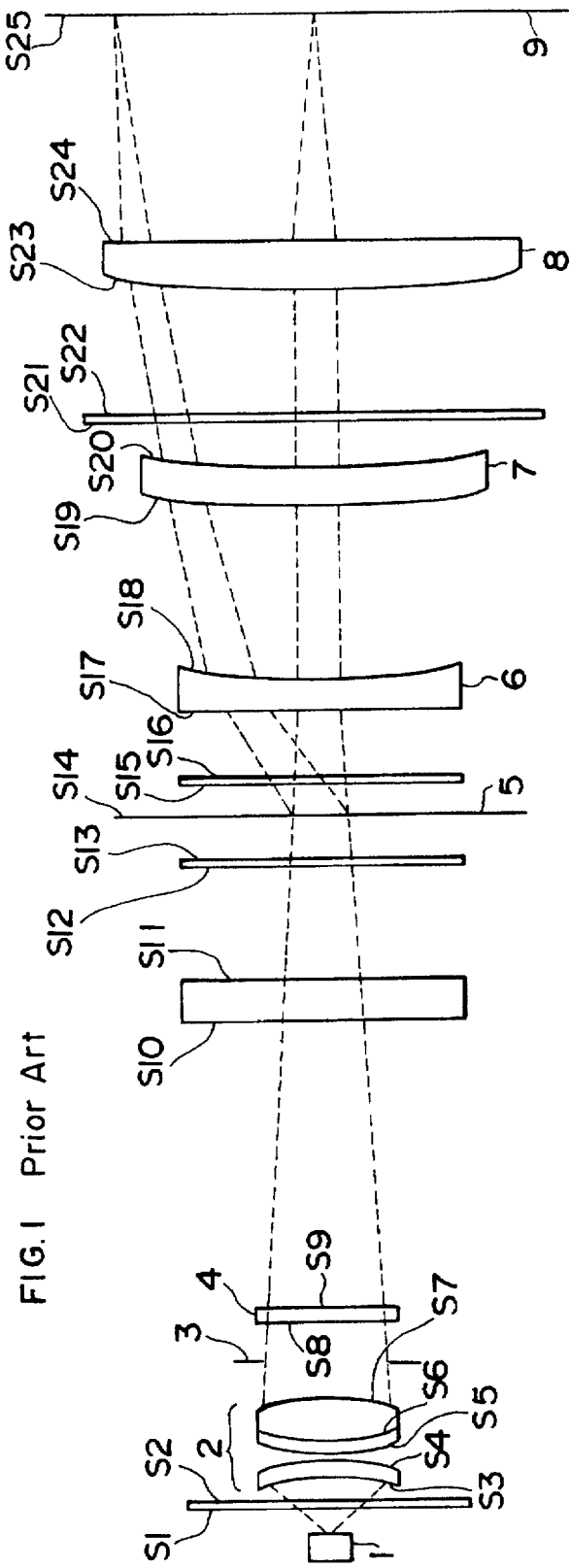
FIG. 1 is a cross-sectional view of a conventional laser beam scanning apparatus with respect to a main scanning direction.
Figure 2:
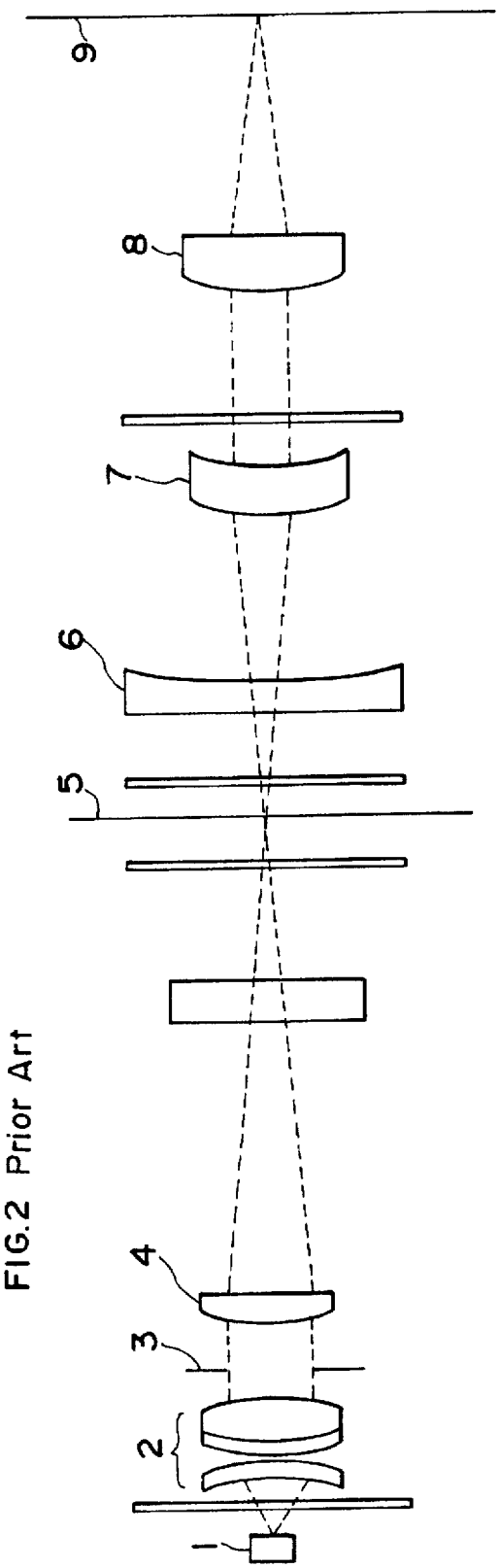
FIG. 2 is a cross-sectional view of the conventional laser beam scanning apparatus with respect to a sub-scanning direction.

A laser beam scanning apparatus as one embodiment of the present invention will be explained hereinbelow with reference to FIGS. 3 and 4.

As shown in FIG. 3, with respect to the main scanning direction, a laser beam 10 emitted from a semiconductor laser 1 is formed into a bundle of parallel rays by an objective lens 17 composed of a collimator lens. The bundle of parallel rays is regulated in width by an aperture 18 so as to have a predetermined beam diameter. Subsequently, the bundle of parallel rays is converged by a converging lens 20 with respect to the main scanning direction. The converged laser beam is deflected by a deflector 5 such as a polygonal mirror which has been disclosed in U.S. Pat. No. 5,245,462, and thereafter is concentrated on a scanned surface 9 (a photosensitive surface) by means of first, second and third scanning lenses 6, 7, 8 so as to scan the scanned surface 9.

While, as shown in FIG. 4, with respect to the sub-scanning direction, the laser beam 10 emitted from the semiconductor laser 1 is formed into a bundle of parallel rays by the objective lens 17. The bundle of parallel rays is regulated in width by the aperture 18 so as to have a predetermined beam diameter. Then, the bundle of parallel rays is converged by a cylindrical lens 19 which has power only in the sub-scanning direction. The converged laser beam is initially concentrated linearly on a reflecting surface of the deflector 5, and thereafter is concentrated on the scanned surface 9 by means of the scanning lenses 6, 7, 8.

The following Table 1 shows an exemplary composition of the conventional laser beam scanning apparatus. In the Table 1, si (i=1, 2, 3, ....) represents the ith lens surface from the object side with respect to each of the optical elements in the conventional laser beam scanning apparatus as follows.

s1, 2 : glass cover for laser diode s3 to 7 : objective lens group of three lenses s8, 9 : cylindrical lens s10, 11 : first plate at the rear of the cylindrical lens s12, 13 : second plate between the first plate and the polygonal mirror s14 : polygonal mirror s15, 16 : third plane plate at the rear of the polygonal mirror s17, 18 : first scanning lens s19, 20 : second scanning lens s21, 22 : fourth plate between the second scanning lens and the third scanning lens s23, 24 : third scanning lens s25 : scanned surface Moreover, in the Table 1, the surfaces marked with asterisks are aspherical, and are defined by the following equation which represents a surface configuration of an aspherical surface:

$$X = \frac{CY^2}{1+\sqrt{1-\epsilon Y^2 C^2}} + \Sigma_i A_i Y_i$$

wherein, X represents the amount of displacement from the reference surface along the optical axis; Y represents height in a direction vertical to the optical axis; C represents a paraxial radius of curvature; $\epsilon$ represents a quadric surface parameter; and Ai represents an ith-order aspherical coefficient.

TABLE 1

| *Distance from laser diode to glass cover: −8.502104 (mm) | | | |
|---|---|---|---|
| R:radius of curvature (mm) | | | |
| main scanning direction | sub-scanning direction | D:distance (mm) | N:refractive index |
| s1  ∞ | | 0.250 | 1.51118 |
| s2  ∞ | | 5.000 | |
| s3  −35.20600 | | 3.000 | 1.82489 |
| s4  −12.41600 | | 0.500 | |
| s5  38.02599 | | 2.000 | 1.82489 |
| s6  14.79000 | | 6.000 | 1.51118 |
| s7  −29.64200 | | 23.200 | |
| s8*  ∞ | 155.61550 | 4.000 | 1.51118 |
| s9  ∞ | | 113.373 | |
| s10  ∞ | | 15.000 | 1.51118 |
| s11  ∞ | | 50.000 | |
| s12  ∞ | | 2.000 | 1.51118 |
| s13  ∞ | | 10.000 | |
| s14  ∞ | | 10.000 | |
| s15  ∞ | | 2.000 | 1.51118 |
| s16  ∞ | | 30.000 | |
| s17  ∞ | | 8.000 | 1.51118 |
| s18  191.25213 | | 65.000 | |
| s19  289.43560 | | 10.000 | 1.78571 |
| s20*  1205.09514 | | 10.000 | |
| s21  ∞ | | 2.000 | 1.51118 |
| s22  ∞ | | 135.850 | |
| s23*  44.59001 | 44.59000604 | 5.000 | 1.48457 |
| s24  ∞ | | 131.317 | |
| s25  ∞ | | | |

| Aspherical surface coefficients |
|---|
| s8 : $\epsilon$ = 0.10000 × 10 |
| s20 : $\epsilon$ = 0.10000 × 10 |
| A4 = −0.43978385 × 10$^{-8}$ |
| A6 = 0.74360739 × 10$^{-13}$ |
| A8 = 0.33190334 × 10$^{-16}$ |
| A10 = 0.87759710 × 10$^{-20}$ |
| A12 = −0.16782203 × 10$^{-23}$ |
| s23 : $\epsilon$ = 0.10000 × 10 |
| A2 = 0.12200000 × 10$^{-6}$ |
| A4 = 0.15500000 × 10$^{-11}$ |

The following Table 2 shows an exemplary composition of the laser beam scanning apparatus according to the present invention. In the Table 2, ti (i=1, 2, 3, ....) represents the ith lens surface from the object side with respect to each of the optical elements in the laser beam scanning apparatus according to the present invention as follows.

t1, 2 : glass cover for laser diode t3, 4 : objective lens t5, 6 : cylindrical lens t7, 8 : first plate at the rear of the cylindrical lens t9, 10 : converging lens t11, 12 : second plate between the converging lens and the polygonal mirror t13 : polygonal mirror t14, 15 : third plane plate at the rear of the polygonal mirror t16, 17: first scanning lens t18, 19 : second scanning lens t20, 21 : fourth plate between the second scanning lens and the third scanning lens t22, 23 : third scanning lens t24 : scanned surface Moreover, in the Table 2, the surfaces marked with asterisks are aspherical, and are defined by the following equation which represents a surface configuration of an aspherical surface.

$$X = \frac{CY^2}{1 + \sqrt{1 - \epsilon Y^2 C^2}} + \sum_i A_i Y^i$$

In said equation, X represents the amount of displacement from the reference surface along the optical axis; Y represents height in a direction vertical to the optical axis; C represents a paraxial radius of curvature; $\epsilon$ represents a quadric surface parameter; and Ai represents an ith-order aspherical coefficient.

TABLE 2

*Distance from laser diode to glass cover: −2.019832 (mm)

R:radius of curvature (mm)

| | main scanning direction | sub-scanning direction | D:distance (mm) | N:refractive index |
|---|---|---|---|---|
| t1 | ∞ | | 0.300 | 1.51118 |
| t2 | ∞ | | 11.000 | |
| t3 | −67.50198 | | 2.800 | 1.82489 |
| t4* | −10.65300 | | 23.200 | |
| t5* | ∞ | 155.61550000 | 4.000 | 1.51118 |
| t6 | ∞ | | 232.000 | |
| t7 | ∞ | | 15.000 | 1.51118 |
| t8 | ∞ | | 30.000 | |
| t9* | 168.20000000 | | 5.000 | 1.51118 |
| t10 | ∞ | | 15.000 | |
| t11 | ∞ | | 2.000 | 1.51118 |
| t12 | ∞ | | 10.000 | |
| t13 | ∞ | | 10.000 | |
| t14 | ∞ | | 2.000 | 1.51118 |
| t15 | ∞ | | 30.000 | |
| t16 | ∞ | | 8.000 | 1.51118 |
| t17 | 191.25213 | | 65.000 | |
| t18 | 289.43560 | | 10.000 | 1.78571 |
| t19* | 1205.09514 | | 10.000 | |
| t20 | ∞ | | 2.000 | 1.51118 |
| t21 | ∞ | | 135.850 | |
| t22* | 44.59001 | 44.59000604 | 5.000 | 1.48457 |
| t23 | ∞ | | 131.317 | |
| t24 | ∞ | | | |

Aspherical surface coefficients t4 : $\epsilon = 0.10000 \times 10$
$A4 = -0.47385862 \times 10^{-4}$
$A6 = 0.34070564 \times 10^{-6}$
$A8 = 0.23874232 \times 10^{-8}$
$A10 = 0.13725987 \times 10^{-10}$
t5 : $\epsilon = 0.10000 \times 10$
t9 : $\epsilon = 0.10000 \times 10$
t19: $\epsilon = 0.10000 \times 10$
$A4 = -0.43978385 \times 10^{-8}$
$A6 = 0.74360739 \times 10^{-13}$
$A8 = 0.33190334 \times 10^{-16}$
$A10 = 0.87759710 \times 10^{-20}$
$A12 = -0.16782203 \times 10^{-23}$
t22: $\epsilon = 0.10000 \times 10$ TABLE 2-continued

*Distance from laser diode to glass cover: −2.019832 (mm)

R:radius of curvature (mm)

| main scanning direction | sub-scanning direction | D:distance (mm) | N:refractive index |
|---|---|---|---|
| $A2 = 0.12200000 \times 10^{-6}$ | | | |
| $A4 = 0.15500000 \times 10^{-11}$ | | | |

The following Table 3 shows the relationship between the beam diameter of the surface s7 on the objective lens and the beam diameter on the surface s14 of the polygonal mirror in the conventional laser beam scanning apparatus, and the relationship between the beam diameter on the surface t4 of the objective lens and the beam diameter on surface t13 of the polygonal mirror in the laser beam scanning apparatus according to the present invention.

TABLE 3

| | beam diameter on objective lens | beam diameter on polygonal mirror |
|---|---|---|
| conventional apparatus | 5.50000 | 4.00248 |
| apparatus according to present invention | 3.53713 | 4.00248 |

Various structures of lenses may be used as the scanning lenses 6, 7, 8 according to design. Further, the converging lens 20 of the present embodiment is not limited to a plano-convex lens. A double-convex lens or a meniscus lens may be used. Furthermore, it is possible to converge the bundle of parallel rays directed to the scanning lenses 6, 7, 8 by means of a concave lens in combination with either of plano-convex lens, double-convex lens, or meniscus lens.

In the laser beam scanning apparatus according to the present invention, with respect to the main scanning direction, the bundle of parallel rays emitted from the objective lens 17 is converged by the converging lens 20 immediately in front of the deflector, and thereafter is incident to the scanning lenses. Therefore, as is clear from the Table 3, compared with the conventional laser beam scanning apparatus, the beam diameter of the laser beam immediately after being emitted from the objective lens 17 may be very small in the laser beam scanning apparatus according to the present invention. As the result, the effective diameter of the objective lens 17 can be small, i.e., the outer diameter of the objective lens 17 can be small even if the distance from the objective lens 17 to the deflector 5 is made longer, or the convergence degree of the laser beam incident to the scanning lenses is made higher.

Further, in the conventional laser beam scanning apparatus, it is necessary to correct the aberration by an objective lens group composed of plural lenses. While, in the laser beam scanning apparatus according to the present invention, one objective lens may be used, for example.

Moreover, when the laser beam is converged by the objective lens, optical performance generally declines upon a change of the magnification of the objective lens. While, in the apparatus according to the present invention, the objective lens is used to form the laser beam into a bundle of parallel rays, consequently the optical performance does not decline upon the change of the magnification of the objective lens.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser beam scanning apparatus comprising:
   a light source for emitting a laser beam;
   a first optical system for forming the laser beam into a bundle of substantially parallel rays with respect to both a main scanning direction and a sub-scanning direction;
   a second optical system for converging the laser beam emitted from the first optical system with respect to the sub-scanning direction;
   a third optical system for converging the laser beam emitted from the second optical system with respect to the main scanning direction, said third optical system transmitting the laser beam with respect to the sub-scanning direction without performing an optical function;
   a deflector for deflecting the converged laser beam emitted from the third optical system, said deflector having a reflecting surface on which the laser beam converged by said second optical system is focused with respect to the sub-scanning direction; and
   a fourth optical system for imaging the deflected laser beam on a beam receiving surface.

2. The laser beam scanning apparatus as claimed in claim 1, wherein said light source includes a semiconductor laser, and said deflector includes a rotatable polygonal mirror.

3. The laser beam scanning apparatus as claimed in claim 1, wherein the third optical system includes a plano-convex lens.

4. The laser beam scanning apparatus as claimed in claim 1, wherein the third optical system includes a double-convex lens.

5. The laser beam scanning apparatus as claimed in claim 1, wherein the third optical system includes a meniscus lens.

6. The laser beam scanning apparatus as claimed in claim 1, further comprising:
   an aperture provided between the first and second optical systems for regulating the beam width of the bundle of the substantially parallel rays emitted from the first optical system.

7. The laser beam scanning apparatus as claimed in claim 1, wherein the third optical system is located immediately in front of the deflector.

8. In a laser beam scanning apparatus comprising laser beam generating means for generating a laser beam, deflecting means for deflecting the laser beam, and optical means for imaging the laser beam deflected by said deflecting means onto a beam receiving surface, said laser beam generating means comprising:
   a collimator lens which forms a laser beam from a light source into a bundle of substantially parallel rays with respect to both a main scanning and a sub-scanning direction;
   a first converging lens which converges the the laser beam emitted from the collimator lens with respect to the sub-scanning direction, said first converging lens focusing the laser beam emitted from the laser generating means on the reflecting surface with respect to the sub-scanning direction; and
   a second converging lens which converges the laser beam emitted from the first converging lens with respect to the main scanning direction, said converging lens having a refractive power only in a main scanning direction.

9. The laser beam scanning apparatus as claimed in claim 8, wherein said light source includes a semiconductor laser, and said deflecting means includes a rotatable polygonal mirror.

10. The laser beam scanning apparatus as claimed in claim 8, wherein the converging lens is a plano-convex lens.

11. The laser beam scanning apparatus as claimed in claim 8, wherein the converging lens is a double-convex lens.

12. The laser beam scanning apparatus as claimed in claim 8, wherein the converging lens is a meniscus lens.

13. The laser beam scanning apparatus as claimed in claim 8, wherein the converging lens is located immediately in front of the deflecting means.

14. A beam scanning method in a laser beam scanning apparatus, said beam scanning method comprising the steps of:
   emitting a laser beam from a light source;
   focusing the laser beam on a reflecting surface with respect to the sub-scanning direction;
   converging the laser beam with respect to the main scanning direction; and
   deflecting the laser beam on a beam receiving surface by rotating the reflecting surface;
   wherein the converging step does not perform an optical function in the sub-scanning direction.

15. The method of claim 14, wherein the converging step occurs after the focusing step and prior to the deflecting step.

16. The method of claim 15, wherein the converging step occurs immediately before the deflecting step.

17. The method of claim 16, wherein the focusing step corrects an inclination of the reflecting surface.

* * * * *